United States Patent Office.

JOHN McKINSEY, OF MILLVILLE, NEW JERSEY.

Letters Patent No. 75,561, dated March 17, 1868.

IMPROVED VERMIFUGE.

The Schedule referred to in these Letters Patent and making part of the same.

TO ALL WHOM IT MAY CONCERN:

Be it known that I, JOHN McKINSEY, of Millville, in the county of Cumberland, and State of New Jersey, have invented a new and improved Vermifuge; and I do hereby declare that the following is a full, clear, and exact description thereof, which will enable those skilled in the art to make and use the same.

This invention and discovery relates to a new composition or medicine designed to expel worms from the human system; and it consists in combining the ingredients hereinafter named in about the proportions given.

I am aware that there are many kinds of vermifuge in market, or a variety of what is called "worm medicine," but I am not aware that any remedy has heretofore been discovered that may be considered a specific for worms.

After much experience in this line of practice, and after many experiments, with a view of discovering a proper remedy for the disease, I have ascertained that when certain vegetable substances are properly combined or prepared, the desired specific is formed.

In carrying out my discovery, I use as my principal ingredients worm-seed, aloes, and catgut, which latter is a medicinal plant of much value in this connection.

The medicine is composed as follows: One ounce worm-seed, one ounce catgut, steeped together in water, to which are added one-fourth of an ounce of aloes, one pound of white sugar, and five drops sassafras-essence. Boil to a thin sirup, when the medicine is ready for use.

What I claim as new, and desire to secure by Letters Patent, is—

A vermifuge or worm-medicine, composed of the ingredients (and in about the proportions) named, or substantially as described.

JOHN McKINSEY.

Witnesses:
 WILLIAM F. MOORE,
 JAMES H. WHITE.